(12) United States Patent
Li et al.

(10) Patent No.: US 12,067,883 B2
(45) Date of Patent: Aug. 20, 2024

(54) REDUNDANT COMMUNICATION METHOD, APPARATUS AND SYSTEM FOR COOPERATIVE AUTONOMOUS DRIVING PLATOONING

(71) Applicant: BEIJING TUSEN ZHITU TECHNOLOGY CO., LTD., Beijing (CN)

(72) Inventors: Wenrui Li, Shanghai (CN); Nan Wu, Shanghai (CN); Rui Peng, Shanghai (CN); Qingxin Bi, Shanghai (CN); Yuhe Jin, Shanghai (CN); Yiming Li, Shanghai (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 516 days.

(21) Appl. No.: 17/334,467

(22) Filed: May 28, 2021

(65) Prior Publication Data
US 2021/0350709 A1 Nov. 11, 2021

Related U.S. Application Data

(63) Continuation of application No. PCT/CN2019/077080, filed on Mar. 6, 2019.

(30) Foreign Application Priority Data

Nov. 30, 2018 (CN) .......................... 201811452957.4

(51) Int. Cl.
*G08G 1/00* (2006.01)
*G08G 1/0967* (2006.01)
*H04W 4/46* (2018.01)

(52) U.S. Cl.
CPC ......... *G08G 1/22* (2013.01); *G08G 1/096791* (2013.01); *H04W 4/46* (2018.02)

(58) Field of Classification Search
CPC .......... G08G 1/00; G08G 1/0967; G08G 1/22; H04W 4/46; H04W 24/04
See application file for complete search history.

(56) References Cited

U.S. PATENT DOCUMENTS 10,520,581 B2 * 12/2019 Schuh .................. G08G 1/166
10,736,126 B2 * 8/2020 Cho ..................... H04W 72/566
(Continued)

FOREIGN PATENT DOCUMENTS

CN 107409370 A 11/2017
CN 108182817 A 6/2018
(Continued)

OTHER PUBLICATIONS

International Application No. PCT/CN2019/077080, International Preliminary Report on Patentability and Written Opinion Mailed May 25, 2021, pp. 1-7.
(Continued)

*Primary Examiner* — Tan Q Nguyen
(74) *Attorney, Agent, or Firm* — Perkins Coie LLP

(57) ABSTRACT

The present disclosure relates to Internet of Vehicles technology, and provides a method, an apparatus, and system for redundant communication for platooning. The method includes: transmitting application data to be transmitted to at least two V2V devices; and controlling the at least two V2V devices that have received the application data to transmit the application data to a predetermined air interface, such that a receiving apparatus obtains the application data from the air interface. With the redundant configuration of the V2V devices, the problem caused by communication failure of one single V2V device can be avoided, so as to ensure stability of V2V communication and guarantee safe operation for platooning.

20 Claims, 4 Drawing Sheets

(56) References Cited

U.S. PATENT DOCUMENTS

| | | | | |
|---|---|---|---|---|
| 11,689,903 | B2* | 6/2023 | Nguyen | H04W 4/46 |
| | | | | 455/450 |
| 2014/0112242 | A1* | 4/2014 | Vilmur | H04B 7/2606 |
| | | | | 370/327 |
| 2016/0091396 | A1 | 3/2016 | Miller | |
| 2018/0084511 | A1* | 3/2018 | Wu | H04W 72/23 |
| 2018/0255562 | A1* | 9/2018 | Cho | H04W 4/42 |
| 2018/0288589 | A1* | 10/2018 | Punithan | H04W 72/542 |
| 2019/0020987 | A1* | 1/2019 | Khoryaev | H04W 76/14 |
| 2019/0044728 | A1* | 2/2019 | Karmoose | H04L 9/3242 |
| 2019/0394786 | A1* | 12/2019 | Parron | H04L 5/0032 |
| 2020/0135032 | A1* | 4/2020 | Switkes | H04W 4/023 |
| 2021/0168574 | A1* | 6/2021 | Zhang | H04W 8/005 |

FOREIGN PATENT DOCUMENTS

| | | |
|---|---|---|
| CN | 108633020 A | 10/2018 |
| CN | 108712733 A | 10/2018 |
| WO | 2018064179 A1 | 4/2018 |
| WO | 2018182590 A1 | 10/2018 |

OTHER PUBLICATIONS

International Application No. PCT/CN2019/077080, International Search Repot and Written Opinion Mailed Aug. 8, 2019, pp. 1-11.
Chinese Application No. 2018145298574 First Search Report Mailed Mar. 11, 2020, pp. 1-2.
Chinese Application No. 2018145298574 First Office Action Mailed Nov. 10, 2020, pp. 1-14.
Chinese Application No. 2018145298574 Second Office Action Mailed May 20, 2021, pp. 1-14.
European Patent Office, Extended European search report for EP 19888593.1, Mailing Date: Jul. 21, 2022, 23 pages.
Jacob, Richard, et al., "Hybrid V2X Communications: Multi-RAT as Enabler for Connected Autonomous Driving", 2018 IEEE 29th Annual International Symposium on Personal, Indoor, and Mobile Radio Communications (PIMRC), IEEE, Sep. 9, 2018, pp. 1370-1376.
LG Electronics, "3GPP TSG-SA WG1 Meeting #76bis, eV2X Requirements for SMARTER", Jan. 16-20, 2017, 6 pages, S1-170334, Revision of S1-170075, Spokane, USA.
European Patent Office, Communication pursuant to Article 94(3) EPC for EP 19888593.1, Mailing Date: Apr. 23, 2024, 10 pages.

* cited by examiner

REDUNDANT COMMUNICATION METHOD, APPARATUS AND SYSTEM FOR COOPERATIVE AUTONOMOUS DRIVING PLATOONING

CROSS-REFERENCE TO RELATED APPLICATIONS

The present disclosure is a continuation of and claims priority to International Application No. PCT/CN2019/077080, entitled "REDUNDANT COMMUNICATION METHOD, APPARATUS AND SYSTEM FOR COOPERATIVE AUTONOMOUS DRIVING PLATOONING", filed on Mar. 6, 2019, which claims priority to and benefit of Chinese Patent Application No. 201811452957.4, titled "REDUNDANT COMMUNICATION METHOD, APPARATUS AND SYSTEM FOR COOPERATIVE AUTONOMOUS DRIVING PLATOONING", filed on Nov. 30, 2018, both of which are incorporated herein by reference in their entirety.

TECHNICAL FIELD

The present disclosure relates to Internet of Vehicles technology, and more particularly, to a method, an apparatus, and a system for redundant communication for platooning.

BACKGROUND

At present, a collaborative autonomous driving fleet, or platooning, refers to a plurality of vehicles tagging along at an extremely short distance in a platoon with support of autonomous driving technology and Vehicle-to-Vehicle (V2V) communication technology. In such platoon, the distance between vehicles could be only 20 meters or shorter, much shorter than a typical safe driving distance. The extremely short distance allows an airflow cut through by a lead vehicle to be directly accepted by a following vehicle at the rear of the lead vehicle, without forming a low-pressure turbulence zone, thereby effectively reducing the overall air resistance of the entire platoon while moving. Generally, with the resistance reduced by platooning, fuel consumption can be reduced by nearly 10%. The main reason why the platoon can maintain such a short interval is the benefit from the low latency of V2V communication, which can achieve end to end communication within 100 ms. Therefore, based on the V2V technology, information can be exchanged between vehicle, and a group of vehicles in a platoon can follow a lead vehicle and control their own operations in accordance with the operations of the lead vehicle. For example, if the lead vehicle operates such as accelerating, braking, or steering, the following vehicles can perform the same operation in a very short period of time.

However, in order to allow vehicles to move with an extremely short distance in a platoon, high quality of V2V communication is required. Since the distance between vehicles is very small, once the V2V communication fails and thus the information sharing channel between the vehicles is blocked, rear-end collisions are very likely to occur. It can be seen that how to ensure stability of V2V communication and avoid V2V communication failure has become a problem to be solved.

SUMMARY

The embodiments of the present disclosure provide a method, an apparatus, and a system for redundant communication for platooning, capable of ensuring stability of V2V communication and avoiding V2V communication failure.

In order to achieve the above object, the following technical solutions are provided.

A method for redundant communication for platooning is provided. The method includes: transmitting application data to be transmitted to at least two V2V devices; and controlling each of the at least two V2V devices that have received the application data to transmit the application data to a predetermined air interface, such that a receiving apparatus obtains the application data from the air interface.

A method for redundant communication for platooning is provided. The method includes: controlling each of at least two V2V devices to obtain application data from an air interface; and obtaining, from each of the at least two V2V devices, the application data corresponding to the V2X device, and fusing and verifying the application data to obtain valid data.

A transmitting apparatus is provided. The transmitting apparatus includes a first main processing device and at least two V2V devices. The first main processing device is configured to transmit application data to be transmitted to the at least two V2V devices. The first main processing device is further configured to control each of the at least two V2V devices that have received the application data to transmit the application data to a predetermined air interface, such that a receiving apparatus obtains the application data from the air interface.

A receiving apparatus is provided. The receiving apparatus includes a second main processing device and at least two V2V devices. The second main processing device is configured to control each of the at least two V2V devices to obtain application data from an air interface. The second main processing device is further configured to obtain, from each of the at least two V2V devices, the application data corresponding to the V2X device, and fuse and verify each application data to obtain valid data.

A computer readable storage medium is provided. The computer readable storage medium has a computer program stored thereon. The program, when executed by a processor, implements the above method for redundant communication for platooning corresponding to the transmitting apparatus.

A computer readable storage medium is provided. The computer readable storage medium has a computer program stored thereon. The program, when executed by a processor, implements the above method for redundant communication for platooning corresponding to the receiving apparatus.

A transmitting apparatus is provided. The transmitting apparatus includes: at least two V2V devices and a controller. The controller includes a memory and a processor. The memory stores a computer program which, when executed by the processor, implements the above method for redundant communication for platooning corresponding to the transmitting apparatus.

A receiving apparatus is provided. The receiving apparatus includes: at least two V2V devices and a controller. The controller includes a memory and a processor. The memory stores a computer program which, when executed by the processor, implements the above method for redundant communication for platooning corresponding to the receiving apparatus.

A system for redundant communication for platooning is provided. The system includes the above transmitting apparatus and the above receiving apparatus.

With the method, apparatus, and system for redundant communication for platooning according to the embodiments of the present disclosure, a transmitting apparatus can transmit application data to be transmitted to at least two V2V devices, and control each of the at least two V2V devices receiving the application data to transmit the application data to a predetermined air interface. Then, a receiving apparatus can control each of at least two V2V devices to obtain the application data from the air interface, obtain, from each of the at least two V2V devices, the application data corresponding to the V2X device, and fuse and verify the application data to obtain valid data. With the redundant configuration of the V2V devices, the problem caused by communication failure of one single V2V device can be avoided, so as to ensure stability of V2V communication and guarantee safe operation for platooning.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to allow those skilled in the art to better understand the present disclosure, some of the technical terms used in the embodiments of the present disclosure will be explained as follows:

V2V: Vehicle-to-Vehicle (V2V) communication technology is a communication technology that is not limited to fixed base stations, providing direct end-to-end wireless communication for moving vehicles.

V2X: Vehicle to X is a key technology of the future intelligent transportation system. It enables communication between vehicles, vehicles and base stations, and base stations and base stations. In this way, a variety of traffic information such as real-time road conditions, road information, and pedestrian information can be obtained, thereby improving driving safety, reducing congestion, improving traffic efficiency, and providing on-board entertainment information.

Air Interface: Air Interface is a wireless transmission specification between base stations and mobile phones. It defines the frequency, bandwidth, access timing, coding scheme, and handover for each wireless channel.

In the process of implementing the embodiments of the present disclosure, the applicant found that the current V2V communication only has one single V2V device provided at each vehicle. In this case, if the V2V device fails and thus the communication fails, since the distance between vehicles is very small, the information sharing channel between the vehicles is blocked, and rear-end collisions are very likely to occur.

Figure 1:
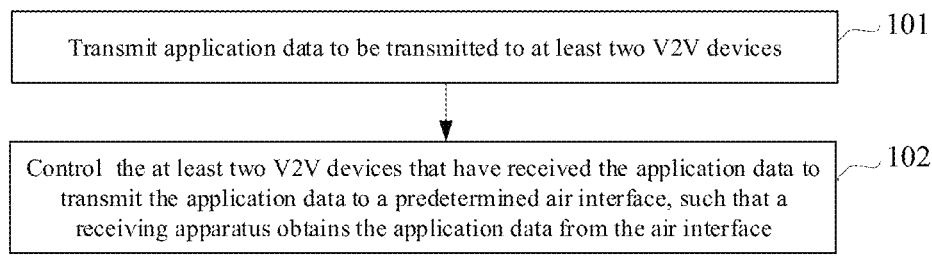
FIG. 1 is a first flowchart illustrating a method for redundant communication for platooning according to an embodiment of the present disclosure.

In view of the above problems, as shown in FIG. 1, an embodiment of the present disclosure provides a method for redundant communication for platooning. When described as being performed by a transmitting apparatus, the method includes the following steps.

At step 101, application data to be transmitted is transmitted to at least two V2V devices.

At step 102, each of the at least two V2V devices that have received the application data is controlled to transmit the application data to a predetermined air interface, such that a receiving apparatus obtains the application data from the air interface.

In particular, the step 101 can be implemented as including: converting the application data to be transmitted into an application data Ethernet message, and transmitting the application data Ethernet message to the at least two V2V devices via a router or a switch. For example, two V2V devices can be used typically. Here, Transmission Control Protocol (TCP) or User Datagram Protocol (UDP) can be used to transmit the application data (or payload, i.e., valid application data) Ethernet message.

In addition, the step 102 of controlling each of the at least two V2V devices that have received the application data to transmit the application data to the predetermined air interface can be implemented as including: controlling each of the at least two V2V devices that have received the application data Ethernet message to packetize the application data into a V2X message; and controlling the at least two V2V devices to transmit their respectively packetized V2X messages using different frequency bands to air interfaces corresponding to the different frequency bands. Here, in particular, the at least two V2V devices can be controlled to transmit their respectively packetized V2X messages using the different frequency bands to the air interfaces corresponding to the different frequency bands via a plurality of antennas provided at each of the at least two V2V devices. Each V2V device may occupy one frequency band, and the plurality of antennas of each V2V device may occupy a same frequency band. With the redundantly provided V2V devices, if one frequency band is interfered, communication can be performed normally using the V2V device corresponding to another frequency band, thereby ensuring normal communication between vehicles. In addition, the different frequency bands can be separated as much as possible to reduce the correlation of impact, i.e., to prevent all of the different frequency bands from being impacted at the same time. For example, in some regions, a spectrum from 5850 Mhz to 5920 Mhz is used, with a difference of 70 Mhz. If there are only two V2V devices, a frequency band from 5850 Mhz to 5860 Mhz can be selected as the frequency band corresponding to a first V2V device, and a frequency band from 5910 Mhz to 5920 Mhz can be selected as the frequency band corresponding to a second V2V device. In addition, for example, a V2V device can be equipped with two antennas, which are arranged on left and right sides of a head of a vehicle, respectively. The present disclosure is not limited to any of these examples. In general, due to signal blocking when the vehicle is moving, a number of redundant antennas can be provided for one V2V device. Typically, as long as one of the antennas can receive signals, the normal communication of the V2V device can be guaranteed.

Figure 2:
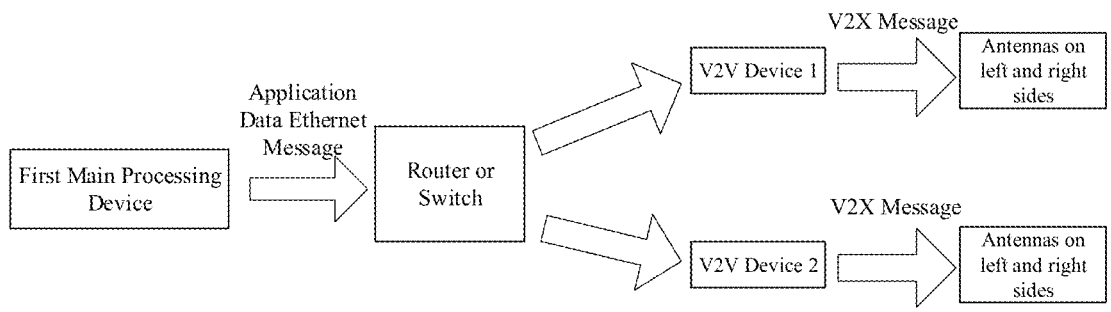
FIG. 2 is a schematic diagram of a data flow in a transmitting apparatus according to an embodiment of the present disclosure.

Here, as shown in FIG. 2, in an example, the transmitting apparatus may include two V2V devices, and each V2V device has two antennas on the left and right sides, respectively. The flow of the application data can be shown in FIG. 2.

Figure 3:
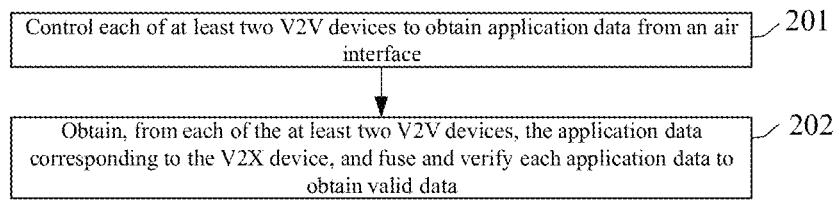
FIG. 3 is a second flowchart illustrating a method for redundant communication for platooning according to an embodiment of the present disclosure.

As shown in FIG. 3, an embodiment of the present disclosure provides a method for redundant communication for platooning. When described as being performed by a receiving apparatus, the method includes the following steps.

At step 201, each of at least two V2V devices is controlled to obtain application data from an air interface.

At step 202, the application data corresponding to the V2X device is obtained from each of the at least two V2V devices, and the application data is fused and verified to obtain valid data.

Here, it is to be noted that the structure of the receiving apparatus may be same as the structure of the above transmitting apparatus. The receiving apparatus may also be used to transmit application data, and the transmitting apparatus may also be used to receive application data. Therefore, the "receiving" and "transmitting" in the receiving apparatus and the transmitting apparatus in the embodiments of the present disclosure are used to indicate the directions of the data flow, rather than indicating that the structures of the receiving apparatus and the transmitting apparatus are different.

Figure 4:
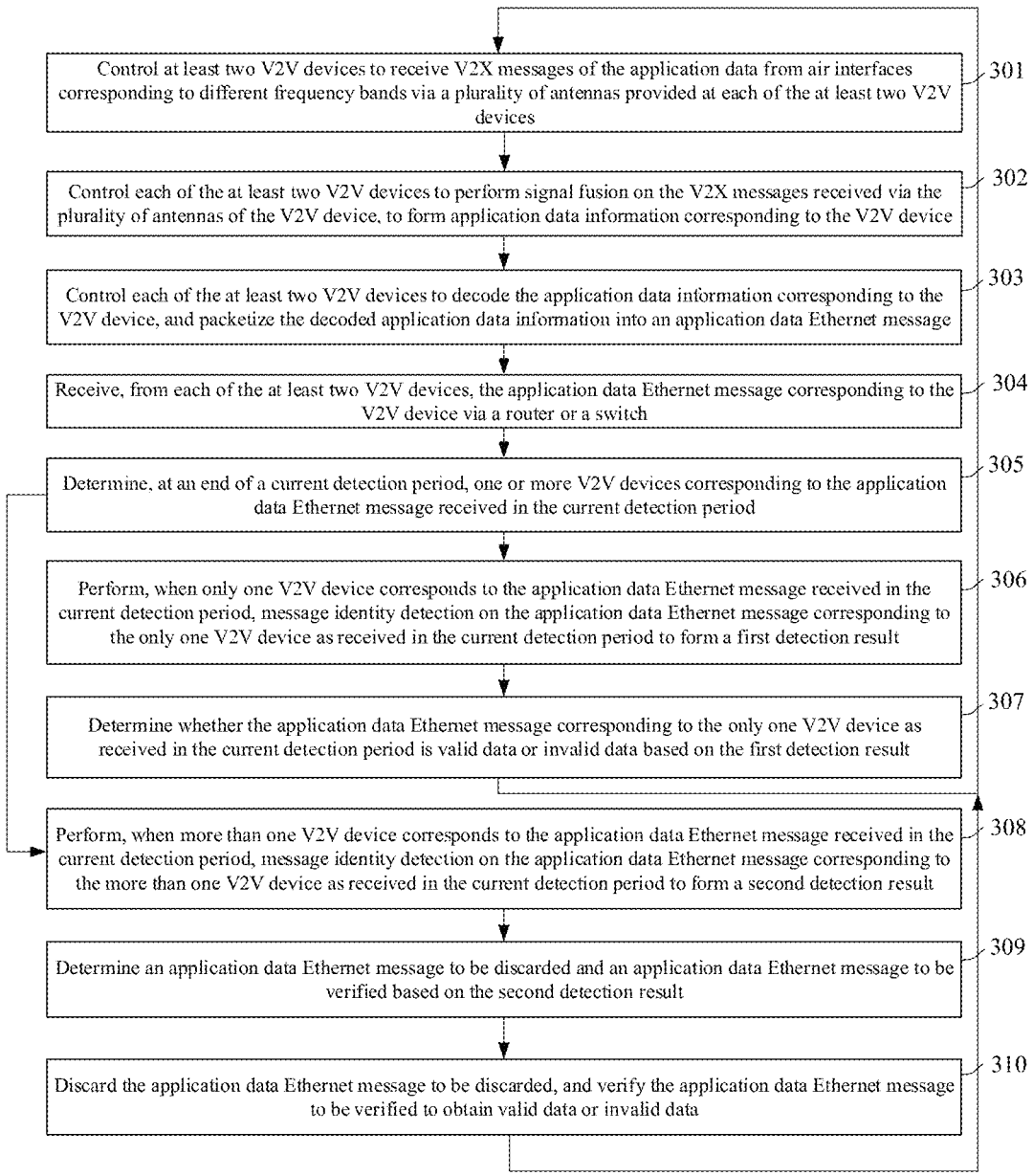
FIG. 4 is a third flowchart illustrating a method for redundant communication for platooning according to an embodiment of the present disclosure.

In order to allow those skilled in the art to better understand the present disclosure, the above steps 201 and 202 will be described in detail below. As shown in FIG. 4, an embodiment of the present disclosure provides a method for redundant communication for platooning. When described as being performed by a receiving apparatus, the method includes the following steps.

At step 301, at least two V2V devices are controlled to receive V2X messages of application data from air interfaces corresponding to different frequency bands via a plurality of antennas provided at each of the at least two V2V devices.

Here, each V2V device occupies one frequency band, and the plurality of antennas of each V2V device occupy a same frequency band. Two V2V devices can also be used here, and the frequency bands occupied by the V2V devices here and the frequency bands occupied by the V2V devices in the transmitting apparatus can be configured correspondingly to each other.

At step 302, each of the at least two V2V devices is controlled to perform signal fusion on the V2X messages received via the plurality of antennas of the V2V device, to form application data information corresponding to the V2V device.

Here, similarly to the above transmitting apparatus, for example, a V2V device can be equipped with two antennas, which are arranged on left and right sides of a head of a vehicle, respectively. The present disclosure is not limited to this example. In general, due to signal blocking when the vehicle is moving, a number of redundant antennas can be provided for one V2V device. Generally, as long as one of the antennas can receive signals, the normal communication of the V2V device can be guaranteed. The signals received by different antennas can be fused by the V2V device automatically. In particular, for example, in a period of a certain time length, Antenna 1 receives a high-level signal, Antenna 2 receives a low-level signal, and they can be fused to obtain a high-level signal. The present disclosure is not limited to this example. Further details of the fusion operation will be omitted here.

At step 303, each of the at least two V2V devices is controlled to decode the application data information corresponding to the V2V device, and packetize the decoded application data information into an application data Ethernet message.

At step 304, the application data Ethernet message corresponding to each of the at least two V2V devices is received from the V2V device via a router or a switch.

At step 305, at an end of a current detection period, one or more V2V devices corresponding to the application data Ethernet message received in the current detection period are determined.

Here, the detection period may be a predetermined message communication period. For example, the message communication period may be 20 ms or 50 ms, and the present disclosure is not limited to any of these examples.

The method proceeds with step 306 or step 308 after the step 305. Of course, there may be a case where no application data Ethernet message corresponding to any V2V device is received, and in this case, the method needs to return to the step 301 for the next detection period.

At step 306, when only one V2V device corresponds to the application data Ethernet message received in the current detection period, message identity detection is performed on the application data Ethernet message corresponding to the only one V2V device as received in the current detection period to form a first detection result.

Here, the step 306 can be implemented by determining whether an identity of the application data Ethernet message corresponding to the only one V2V device as received in the current detection period is same as an expected message identity known in advance.

Here, the expected message identity can be explained as follows. At initialization, the V2V device has not received any IDentity (ID) before, so once an ID of the Ethernet message is received, it becomes the basis for the subsequent process. That is, the ID of the Ethernet message received at initialization is used as an initial ID. Since the transmitting period at the transmitting apparatus is same as the receiving period at the receiving apparatus, both apparatuses can perform an ID+1 operation (ID incremented by one when compared to the previous period) synchronously each time. Thus the expected message ID can be known in advance. If the ID of the application data Ethernet message is different from the expected message ID, the initialization state is re-entered, and the ID of the first frame message received subsequently is used as the new initial ID.

If the ID of the application data Ethernet message corresponding to the only one V2V device as received in the current detection period is same as the expected message ID known in advance, a status flag (or the status flag bit) corresponding to the only one V2V device can be set to a first flag indicating same identity. Here, the status flag (i.e., Flag) corresponding to the V2V device can be set, for example, by setting an initial flag 0 (low-level) to 1 (high-level) to indicate same identity, and the present disclosure is not limited to this example.

If the ID of the application data Ethernet message corresponding to the only one V2V device as received in the current detection period is not same as the expected message ID known in advance, a flag corresponding to the only one V2V device can be maintained as an initial flag to indicate different identity.

At step 307, it is determined whether the application data Ethernet message corresponding to the only one V2V device as received in the current detection period is valid data or invalid data based on the first detection result. After the step 307, the method returns to the step 301 for the next detection period.

Here, the step 307 can be implemented as follows.

It is determined whether the flag corresponding to the only one V2V device is the initial flag or the first flag.

It is determined that the application data Ethernet message corresponding to the only one V2V device as received in the current detection period is invalid data when the flag corresponding to the only one V2V device is the initial flag. Here, the invalid data can be discarded.

It is determined that the application data Ethernet message corresponding to the only one V2V device as received in the current detection period is valid data when the flag corresponding to the only one V2V device is the first flag.

When proceeding with the next detection period, the flag corresponding to the only one V2V device needs to be reset to the initial flag.

At step 308, when more than one V2V device corresponds to the application data Ethernet message received in the current detection period, message identity detection is performed on the application data Ethernet message corresponding to the more than one V2V device as received in the current detection period to form a second detection result.

The step 308 can be implemented as follows.

It is determined whether an identity of the application data Ethernet message corresponding to each V2V device as received in the current detection period is same as an expected message identity known in advance.

A status flag corresponding to each V2V device is set to a first flag indicating same identity when the identity of the application data Ethernet message corresponding to the V2V device as received in the current detection period is same as the expected message identity known in advance.

A flag corresponding to each V2V device is maintained as an initial flag to indicate different identity when the identity of the application data Ethernet message corresponding to the V2V device as received in the current detection period is different from the expected message identity known in advance.

At step 309, an application data Ethernet message to be discarded and an application data Ethernet message to be verified are determined based on the second detection result.

Here, the step 309 can be implemented as follows.

It is determined whether the flag corresponding to each V2V device is the initial flag or the first flag.

It is determined that the application data Ethernet message corresponding to each V2V device as received in the current detection period is an application data Ethernet message to be discarded when the flag corresponding to the V2V device is the initial flag.

It is determined that the application data Ethernet message corresponding to each V2V device as received in the current detection period is an application data Ethernet message to be verified when the flag corresponding to the V2V device is the first flag.

At step 310, the application data Ethernet message to be discarded is discarded, and the application data Ethernet message to be verified is verified to obtain valid data or invalid data. After the step 310, the method returns to the step 301 for the next detection period. When proceeding with the next detection period, the flag corresponding to each V2V device needs to be reset to the initial flag.

Here, the step 310 can be implemented as follows.

Data bits in the application data Ethernet message to be verified corresponding to each V2V device are calculated in accordance with a predetermined algorithm to obtain a calculation result corresponding to the V2V device. The predetermined algorithm may include addition (i.e., Check-Sum), multiplication, or MD5 Message-Digest Algorithm (a widely used cryptographic hash function which can generate a 128-bit (16-byte) hash value to ensure integrity and consistency of information transmission), etc. The present disclosure is not limited to any of these examples.

The calculation results are compared.

When the calculation results are same, the application data Ethernet message to be verified corresponding to each V2V device is determined to be same, and the same application data Ethernet messages to be verified corresponding to the V2V device is determined as valid data.

When different calculation results exist in the calculation results, the application data Ethernet message to be verified corresponding to each V2V device is determined as invalid data. Here, the invalid data can be discarded.

Figure 5:
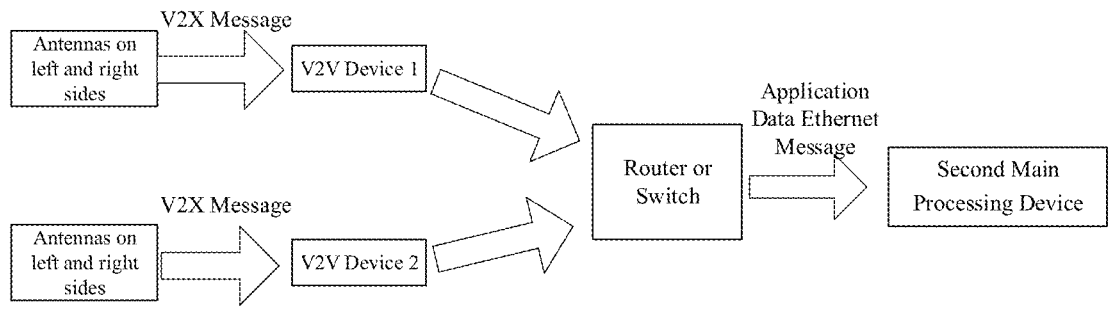
FIG. 5 is a schematic diagram of a data flow in a receiving apparatus according to an embodiment of the present disclosure.

Here, as shown in FIG. 5, in an example, the receiving apparatus may include two V2V devices, and each V2V device has two antennas on the left and right sides, respectively. The flow of the application data can be shown in FIG. 5.

Figure 6:
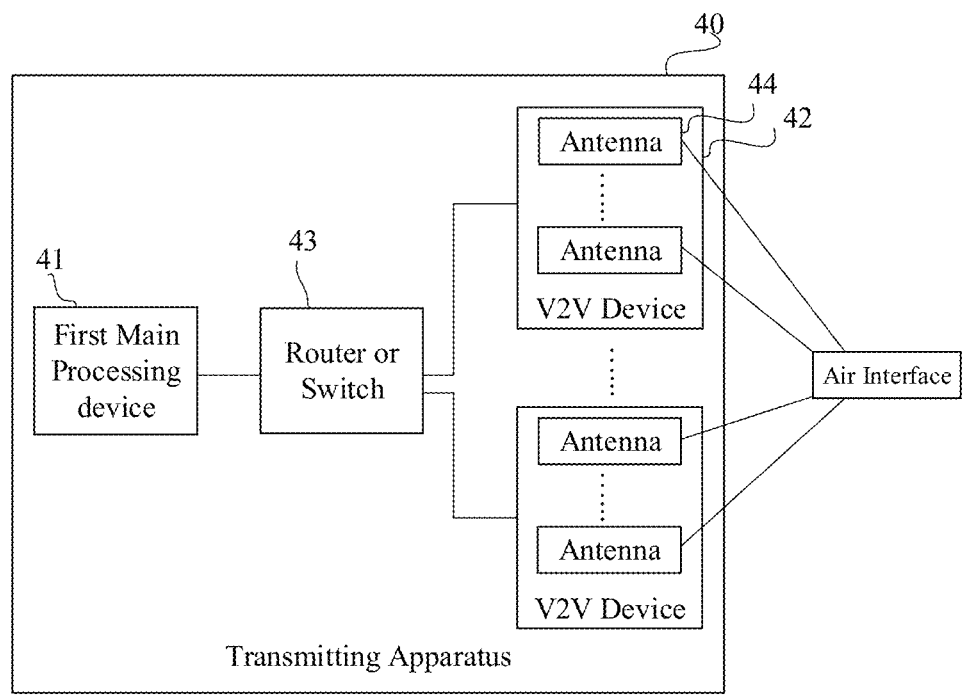
FIG. 6 is a schematic diagram showing a structure of a transmitting apparatus according to an embodiment of the present disclosure.

Correspondingly to the method embodiments of FIG. 1 and FIG. 2, as shown in FIG. 6, an embodiment of the present disclosure also provides a transmitting apparatus 40, including a first main processing device 41 (for example, an industrial computer or an Electronic Control Unit (ECU)) and at least two V2V devices 42.

The first main processing device 41 is configured to transmit application data to be transmitted to the at least two V2V devices 42.

The first main processing device 41 is further configured to control each of the at least two V2V devices 42 that have received the application data to transmit the application data to a predetermined air interface, such that a receiving apparatus 50 obtains the application data from the air interface.

Further, as shown in FIG. 6, the transmitting apparatus 40 can further include a router or switch 43.

The first main processing device 41 can be configured to convert the application data to be transmitted into an application data Ethernet message, and transmit the application data Ethernet message to the at least two V2V devices 42 via the router or switch 43.

In addition, the first main processing device 41 can be configured to control each of the at least two V2V devices 42 that have received the application data Ethernet message to packetize the application data into a V2X message, and control the at least two V2V devices 42 to transmit their respectively packetized V2X messages using different frequency bands to air interfaces corresponding to the different frequency bands.

In addition, as shown in FIG. 6, each of the at least two V2V devices 42 may include a plurality of antennas 44.

The first main processing device 41 can be configured to control the at least two V2V devices 42 to transmit their respectively packetized V2X messages using the different frequency bands to the air interfaces corresponding to the different frequency bands via the plurality of antennas 44 provided at each of the at least two V2V devices 42. Each V2V device may occupy one frequency band, and the plurality of antennas 44 of each V2V device 42 may occupy a same frequency band.

For details of the implementation of the transmitting apparatus 40, reference can be made to the above method embodiments corresponding to FIG. 1 and FIG. 2, and description thereof will be omitted here.

Figure 7:
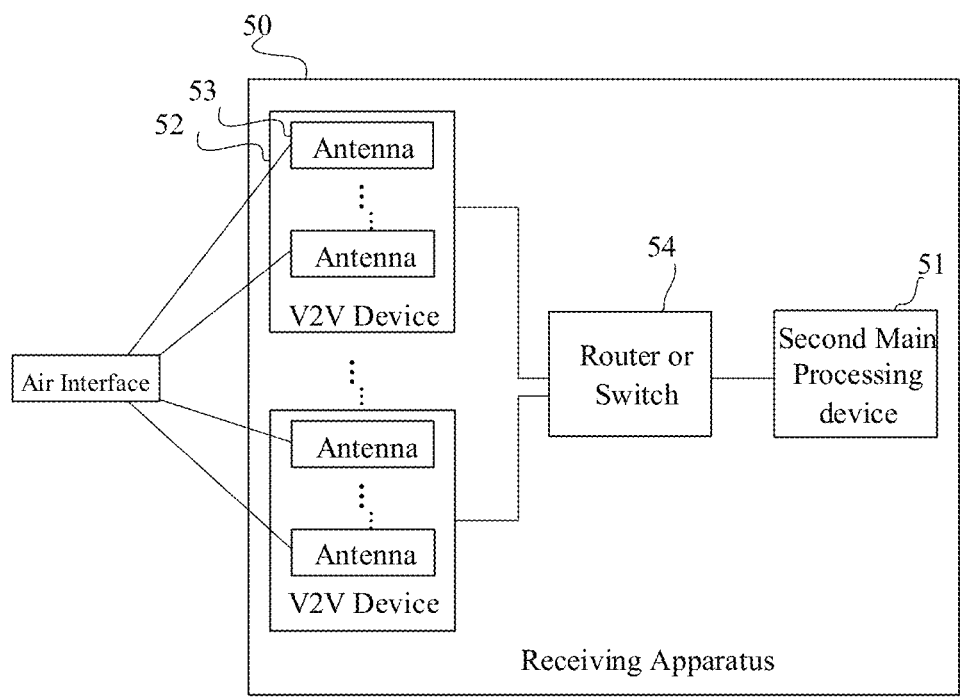
FIG. 7 is a schematic diagram showing a structure of a receiving apparatus according to an embodiment of the present disclosure.

Correspondingly to the method embodiments of FIG. 3, FIG. 4, and FIG. 5, as shown in FIG. 7, an embodiment of the present disclosure also provides a receiving apparatus 50, including a second main processing device 51 (for example, an industrial computer or an ECU) and at least two V2V devices 52.

The second main processing device 51 is configured to control each of the at least two V2V devices 52 to obtain application data from an air interface.

The second main processing device 51 is further configured to obtain, from each of the at least two V2V devices 52, the application data corresponding to the V2X device 52, and fuse and verify the application data to obtain valid data.

In particular, as shown in FIG. 7, each of the at least two V2V devices 52 may include a plurality of antennas 53.

The second main processing device 51 can be configured to control the at least two V2V devices 52 to receive V2X messages of the application data from air interfaces corresponding to different frequency bands via a plurality of antennas 54 provided at each of the at least two V2V devices 53. Each V2V device 52 may occupy one frequency band, and the plurality of antennas of each V2V device 52 may occupy a same frequency band.

The second main processing device 51 can be configured to control each of the at least two V2V devices 52 to perform signal fusion on the V2X messages received via the plurality of antennas 53 of the V2V device 52, to form application data information corresponding to the V2V device 52.

Further, as shown in FIG. 7, the receiving apparatus 50 may further include a router or switch 54.

The second main processing device 51 can be configured to control each of the at least two V2V devices 52 to decode the application data information corresponding to the V2V device 52, and packetize the decoded application data information into an application data Ethernet message, and receive, from each of the at least two V2V devices 52, the application data Ethernet message corresponding to the V2V device 52 via a router or switch 54.

In addition, the second main processing device 51 can be configured to determine, at an end of a current detection period, one or more V2V devices 52 corresponding to the application data Ethernet message received in the current detection period. The detection period can be a predetermined message communication period.

When only one V2V device 52 corresponds to the application data Ethernet message received in the current detection period, the second main processing device 51 can be configured to perform message identity detection on the application data Ethernet message corresponding to the only one V2V device 52 as received in the current detection period to form a first detection result, and determine whether the application data Ethernet message corresponding to the only one V2V device 52 as received in the current detection period is valid data or invalid data based on the first detection result.

When more than one V2V device 52 corresponds to the application data Ethernet message received in the current detection period, the second main processing device 51 can be configured to perform message identity detection on the application data Ethernet message corresponding to the more than one V2V device 52 as received in the current detection period to form a second detection result.

The second main processing device 51 can be configured to determine an application data Ethernet message to be discarded and an application data Ethernet message to be verified based on the second detection result.

The second main processing device 51 can be configured to discard the application data Ethernet message to be discarded and verify the application data Ethernet message to be verified to obtain valid data or invalid data.

In addition, the second main processing device 51 can be further configured to:

determine whether an identity of the application data Ethernet message corresponding to the only one V2V device 52 as received in the current detection period is same as an expected message identity known in advance;

set a status flag corresponding to the only one V2V device 52 to a first flag indicating same identity when the identity of the application data Ethernet message corresponding to the only one V2V device 52 as received in the current detection period is same as the expected message identity known in advance; and maintain a flag corresponding to the only one V2V device 52 as an initial flag to indicate different identity when the identity of the application data Ethernet message corresponding to the only one V2V device 52 as received in the current detection period is different from the expected message identity known in advance.

In addition, the second main processing device 51 can be further configured to:

determine whether the flag corresponding to the only one V2V device 52 is the initial flag or the first flag;

determine that the application data Ethernet message corresponding to the only one V2V device 52 as received in the current detection period is invalid data when the flag corresponding to the only one V2V device 52 is the initial flag; and determine that the application data Ethernet message corresponding to the only one V2V device 52 as received in the current detection period is valid data when the flag corresponding to the only one V2V device 52 is the first flag.

In addition, the second main processing device 51 can be further configured to:

determine whether an identity of the application data Ethernet message corresponding to each V2V device 52 as received in the current detection period is same as an expected message identity known in advance;

set a status flag corresponding to each V2V device 52 to a first flag indicating same identity when the identity of the application data Ethernet message corresponding to the V2V device 52 as received in the current detection period is same as the expected message identity known in advance; and maintain a flag corresponding to each V2V device 52 as an initial flag to indicate different identity when the identity of the application data Ethernet message corresponding to the V2V device 52 as received in the current detection period is different from the expected message identity known in advance.

In addition, the second main processing device 51 can be further configured to:

determine whether the flag corresponding to each V2V device 52 is the initial flag or the first flag;

determine that the application data Ethernet message corresponding to each V2V device 52 as received in the current detection period is an application data Ethernet message to be discarded when the flag corresponding to the V2V device 52 is the initial flag; and determine that the application data Ethernet message corresponding to each V2V device 52 as received in the current detection period is an application data Ethernet message to be verified when the flag corresponding to the V2V device 52 is the first flag.

The second main processing device 51 can be further configured to:

calculate data bits in the application data Ethernet message to be verified corresponding to each V2V device 52 in accordance with a predetermined algorithm to obtain a calculation result corresponding to the V2V device 52, the predetermined algorithm including addition, multiplication, MD5 message digest algorithm;

compare the calculation results;

determine the application data Ethernet message to be verified corresponding to each V2V device 52 to be same, and determine the same application data Ethernet messages to be verified corresponding to the V2V device 52 as valid data, when the calculation results are same; and determine the application data Ethernet message to be verified corresponding to each V2V device 52 as invalid data, when different calculation results exist in the calculation results.

For details of the implementation of the receiving apparatus 50, reference can be made to the above method embodiments corresponding to FIG. 3, FIG. 4, and FIG. 5, and description thereof will be omitted here.

In addition, an embodiment of the present disclosure also provides a computer readable storage medium having a computer program stored thereon. The program, when executed by a processor, implements the above method for redundant communication for platooning corresponding to FIG. 1 or FIG. 2.

In addition, an embodiment of the present disclosure also provides a computer readable storage medium having a computer program stored thereon. The program, when executed by a processor, implements the above method for redundant communication for platooning corresponding to FIG. 3, FIG. 4, or FIG. 5.

In addition, an embodiment of the present disclosure also provides a transmitting apparatus. The transmitting apparatus includes: at least two V2V devices and a controller. The controller includes a memory and a processor. The memory stores a computer program which, when executed by the processor, implements the above method for redundant communication for platooning corresponding to FIG. 1 or FIG. 2.

In addition, an embodiment of the present disclosure also provides a receiving apparatus. The receiving apparatus includes: at least two V2V devices and a controller. The controller includes a memory and a processor. The memory stores a computer program which, when executed by the processor, implements the above method for redundant communication for platooning corresponding to FIG. 3, FIG. 4, or FIG. 5.

In addition, an embodiment of the present disclosure also provides a system for redundant communication for platooning. The system includes the above transmitting apparatus and the above receiving apparatus.

With the method, apparatus, and system for redundant communication for platooning according to the embodiments of the present disclosure, a transmitting apparatus can transmit application data to be transmitted to at least two V2V devices, and control each of the at least two V2V devices that have received the application data to transmit the application data to a predetermined air interface. Then, a receiving apparatus can control each of at least two V2V devices to obtain the application data from the air interface, obtain, from each of the at least two V2V devices, the application data corresponding to the V2X device, and fuse and verify the application data to obtain valid data. With the redundant configuration of the V2V devices, the problem caused by communication failure of one single V2V device can be avoided, so as to ensure stability of V2V communication and guarantee safe operation for platooning.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A vehicle, comprising a second processing device and at least two V2V devices, wherein
each of the at least two V2V devices is configured to obtain application data from an air interface respectively, and
the second processing device is configured to obtain, from the at least two V2V devices, the application data respectively, and fuse and verify the application data to obtain valid data;
the second processing device is further configured to:
perform, in response to receiving an Ethernet message corresponding to the application data from one of the at least two V2V devices in a current detection period, message identity detection on the Ethernet message to form a first detection result;
determine whether the Ethernet message is valid data or invalid data based on the first detection result.

2. The vehicle of claim 1, wherein:
the air interfaces correspond to a plurality of frequency bands;
each of the at least two V2V devices occupies different one of the plurality of frequency bands and comprises a plurality of antennas;
the plurality of antennas of each V2V device occupy a same frequency band; and
each of the at least two V2V devices is further configured to:
receive V2X messages corresponding to the application data from the air interface corresponding to the same frequency band via a plurality of antennas; and
perform signal fusion on the V2X messages received via the plurality of antennas of the V2V device, to form application data information corresponding to the V2V device.

3. The vehicle of claim 2, wherein the second processing device is further configured to:
control each of the at least two V2V devices to decode the application data information corresponding to the V2V device, and packetize the decoded application data information into an Ethernet message; and
receive, from each of the at least two V2V devices, the Ethernet message corresponding to the V2V device.

4. The vehicle of claim 3, wherein the second processing device is further configured to:
determine, at an end of a current detection period, one or more V2V devices corresponding to the Ethernet message received in the current detection period, the detection period being a predetermined message communication period.

5. The vehicle of claim 4, wherein the second processing device is further configured to:
perform, in response to receiving the Ethernet message corresponding to the application data from more than one V2V device in the current detection period, message identity detection on the Ethernet message to form a second detection result;
determine an Ethernet message to be discarded and an Ethernet message to be verified based on the second detection result; and
discard the Ethernet message to be discarded, and verify the Ethernet message to be verified to obtain valid data or invalid data.

6. The vehicle of claim 5, wherein the second processing device is further configured to:
determine whether an identity of the Ethernet message corresponding to each V2V device as received in the current detection period is same as an expected message identity known in advance;
set a status flag corresponding to each V2V device to a first flag indicating same identity when the identity of the Ethernet message corresponding to the V2V device as received in the current detection period is same as the expected message identity known in advance; and
maintain a flag corresponding to each V2V device as an initial flag to indicate different identity when the identity of the Ethernet message corresponding to the V2V device as received in the current detection period is different from the expected message identity known in advance.

7. The vehicle of claim 6, wherein the second processing device is further configured to:
determine whether the flag corresponding to each V2V device is the initial flag or the first flag;

determine that the Ethernet message corresponding to each V2V device as received in the current detection period is an Ethernet message to be discarded when the flag corresponding to the V2V device is the initial flag; and determine that the Ethernet message corresponding to each V2V device as received in the current detection period is an Ethernet message to be verified when the flag corresponding to the V2V device is the first flag.

8. The vehicle of claim 6, wherein the second processing device is further configured to:

calculate data bits in the Ethernet message to be verified corresponding to each V2V device in accordance with a predetermined algorithm to obtain a calculation result corresponding to the V2V device, the predetermined algorithm comprising addition, multiplication, MD5 message digest algorithm;

compare the calculation results;

determine the Ethernet message to be verified corresponding to each V2V device to be same, and determine the same Ethernet messages to be verified corresponding to the V2V device as valid data, when the calculation results are same; and determine the Ethernet message to be verified corresponding to each V2V device as invalid data, when different calculation results exist in the calculation results.

9. The vehicle of claim 4, wherein the second processing device is further configured to:

determine whether an identity of the Ethernet message corresponding to the one of the at least two V2V devices as received in the current detection period is same as an expected message identity known in advance;

set a status flag corresponding to the one of the at least two V2V devices to a first flag indicating same identity when the identity is same as the expected message identity known in advance; and maintain a flag corresponding to the one of the at least two V2V devices as an initial flag to indicate different identity when the is different from the expected message identity known in advance.

10. The vehicle of claim 9, wherein the second processing device is further configured to:

determine whether the flag corresponding to the one of the at least two V2V devices is the initial flag or the first flag;

determine that the Ethernet message is invalid data when the flag corresponding to the one of the at least two V2V devices is the initial flag; and determine that the Ethernet message is valid data when the flag corresponding to the one of the at least two V2V devices is the first flag.

11. A method for redundant communication for platooning, comprising:

controlling at least two V2V devices on a vehicle to obtain application data from an air interface respectively; and obtaining, from the at least two V2V devices, the application data respectively; and fusing and verifying the application data to obtain valid data;

said fusing and verifying the application data to obtain the valid data comprises:

performing, in response to receiving an Ethernet message corresponding to the application data from one of the at least two V2V devices in a current detection period, message identity detection on the Ethernet message to form a first detection result;

determining whether the Ethernet message is valid data or invalid data based on the first detection result.

12. The method of claim 11, wherein:

the air interfaces correspond to a plurality of frequency bands;

each of the at least two V2V devices occupies different one of the plurality of frequency bands and comprises a plurality of antennas;

the plurality of antennas of each V2V device occupy a same frequency band; and said controlling the at least two V2V devices on the vehicle to obtain the application data from the air interface comprises:

controlling the at least two V2V devices to receive V2X messages corresponding to the application data from air interfaces corresponding to different frequency bands via a plurality of antennas of each V2V device; and controlling each of the at least two V2V devices to perform signal fusion on the V2X messages received via the plurality of antennas of the V2V device, to form application data information corresponding to the V2V device.

13. The method of claim 12, wherein said obtaining, from the at least two V2V devices, the application data respectively comprises:

controlling each of the at least two V2V devices to decode the application data information corresponding to the V2V device, and packetize the decoded application data information into an Ethernet message; and receiving, from each of the at least two V2V devices, the Ethernet message corresponding to the V2V device via a router or a switch.

14. The method of claim 13, wherein said fusing and verifying the application data to obtain the valid data comprises:

determining, at an end of a current detection period, one or more V2V devices corresponding to the Ethernet message received in the current detection period, the detection period being a predetermined message communication period;

performing, in response to receiving the Ethernet message corresponding to the application data from more than one V2V in the current detection period, message identity detection on the Ethernet message to form a second detection result;

determining an Ethernet message to be discarded and an Ethernet message to be verified based on the second detection result; and discarding the Ethernet message to be discarded, and verifying the Ethernet message to be verified to obtain valid data or invalid data.

15. The method of claim 11, wherein said performing the message identity detection on the Ethernet message to form the first detection result comprises:

determining whether an identity of the Ethernet message is same as an expected message identity known in advance;

setting a status flag corresponding to the one of the at least two V2V devices to a first flag indicating same identity when the identity of the Ethernet message is same as the expected message identity known in advance; and maintaining a flag corresponding to the one of the at least two V2V devices as an initial flag to indicate different identity when the identity of the Ethernet message is different from the expected message identity known in advance, and said determining whether the Ethernet message is valid data or invalid data based on the first detection result comprises:
  determining whether the flag corresponding to the one of the at least two V2V devices is the initial flag or the first flag;
  determining that the Ethernet message is invalid data when the flag corresponding to the one of the at least two V2V devices is the initial flag; and
  determining that the Ethernet message is valid data when the flag corresponding to the one of the at least two V2V devices is the first flag.

16. A non-transitory computer readable storage medium, having a computer program stored thereon, the program comprising code configured to perform a method for redundant communication for platooning, comprising:
  controlling at least two V2V devices on a vehicle to obtain application data from an air interface respectively; and
  obtaining, from the at least two V2V devices, the application data respectively; and
  fusing and verifying the application data to obtain valid data;
  said fusing and verifying the application data to obtain the valid data comprises:
  performing, in response to receiving an Ethernet message corresponding to the application data from one of the at least two V2V devices in a current detection period, message identity detection on the Ethernet message to form a first detection result;
  determining whether the Ethernet message is valid data or invalid data based on the first detection result.

17. The non-transitory computer readable storage medium of claim 16, wherein
  the air interfaces correspond to a plurality of frequency bands;
  each of the at least two V2V devices occupies different one of the plurality of frequency bands and comprises a plurality of antennas;
  the plurality of antennas of each V2V device occupy a same frequency band; and
  said controlling the at least two V2V devices on the vehicle to obtain the application data from the air interface comprises:
  controlling the at least two V2V devices to receive V2X messages corresponding to the application data from air interfaces corresponding to different frequency bands via a plurality of antennas of each V2V device; and
  controlling each of the at least two V2V devices to perform signal fusion on the V2X messages received via the plurality of antennas of the V2V device, to form application data information corresponding to the V2V device.

18. The non-transitory computer readable storage medium of claim 17, wherein said obtaining, from the at least two V2V devices, the application data respectively comprises:
  controlling each of the at least two V2V devices to decode the application data information corresponding to the V2V device, and packetize the decoded application data information into an Ethernet message; and
  receiving, from each of the at least two V2V devices, the Ethernet message corresponding to the V2V device via a router or a switch.

19. The non-transitory computer readable storage medium of claim 18, wherein said fusing and verifying the application data to obtain the valid data comprises:
  determining, at an end of a current detection period, one or more V2V devices corresponding to the Ethernet message received in the current detection period, the detection period being a predetermined message communication period;
  performing, in response to receiving the Ethernet message corresponding to the application data from more than one V2V in the current detection period, message identity detection on the Ethernet message to form a second detection result;
  determining an Ethernet message to be discarded and an Ethernet message to be verified based on the second detection result; and
  discarding the Ethernet message to be discarded, and verifying the Ethernet message to be verified to obtain valid data or invalid data.

20. The non-transitory computer readable storage medium of claim 16, wherein said performing the message identity detection on the Ethernet message to form the first detection result comprises:
  determining whether an identity of the Ethernet message is same as an expected message identity known in advance;
  setting a status flag corresponding to the one of the at least two V2V devices to a first flag indicating same identity when the identity of the Ethernet message is same as the expected message identity known in advance; and
  maintaining a flag corresponding to the one of the at least two V2V devices as an initial flag to indicate different identity when the identity of the Ethernet message is different from the expected message identity known in advance, and
  said determining whether the Ethernet message is valid data or invalid data based on the first detection result comprises:
  determining whether the flag corresponding to the one of the at least two V2V devices is the initial flag or the first flag;
  determining that the Ethernet message is invalid data when the flag corresponding to the one of the at least two V2V devices is the initial flag; and
  determining that the Ethernet message is valid data when the flag corresponding to the one of the at least two V2V devices is the first flag.

* * * * *